United States Patent [19]
Stoffel

[11] 3,819,126
[45] June 25, 1974

[54] SEAT BELT RETRACTOR WITH GEAR WHEEL ACTUATED LOCKING MEANS

[75] Inventor: Robert W. Stoffel, Ferndale, Mich.

[73] Assignee: International Engineering Service, Inc., Royal Oak, Mich.

[22] Filed: July 21, 1972

[21] Appl. No.: 273,968

[52] U.S. Cl. .................... 242/107.4, 242/107 SB
[51] Int. Cl. .................... A62b 35/02, B65h 63/04
[58] Field of Search ....... 242/107.4, 107 SB, 107 R; 297/385, 388; 280/150 SB

[56] References Cited
UNITED STATES PATENTS

| | | | |
|---|---|---|---|
| 3,018,065 | 1/1962 | Cushman | 242/107.4 |
| 3,343,763 | 9/1967 | Spouge | 242/107.4 |
| 3,450,368 | 6/1969 | Glauser | 242/107.4 |
| 3,482,799 | 12/1969 | Wrighton | 242/107.4 |
| 3,632,056 | 1/1972 | Hibbard | 242/107.4 |
| 3,664,600 | 5/1972 | Sargeant | 242/107.4 |

*Primary Examiner*—John W. Huckert
*Assistant Examiner*—Jon W. Henry
*Attorney, Agent, or Firm*—Charles W. Chandler

[57] ABSTRACT

A seat belt retractor having a first stop for disabling a reel-locking device as the belt is being unwound from a fully wound position, and a second stop for disabling the reel-locking device until the belt is either rapidly unwound, or the vehicle in which the retractor is mounted is disposed in an abnormal position or experiences an abnormal motion. The user can either partially or fully unwind the belt from the reel on its initial unwinding motion without prelocking the reel.

7 Claims, 11 Drawing Figures

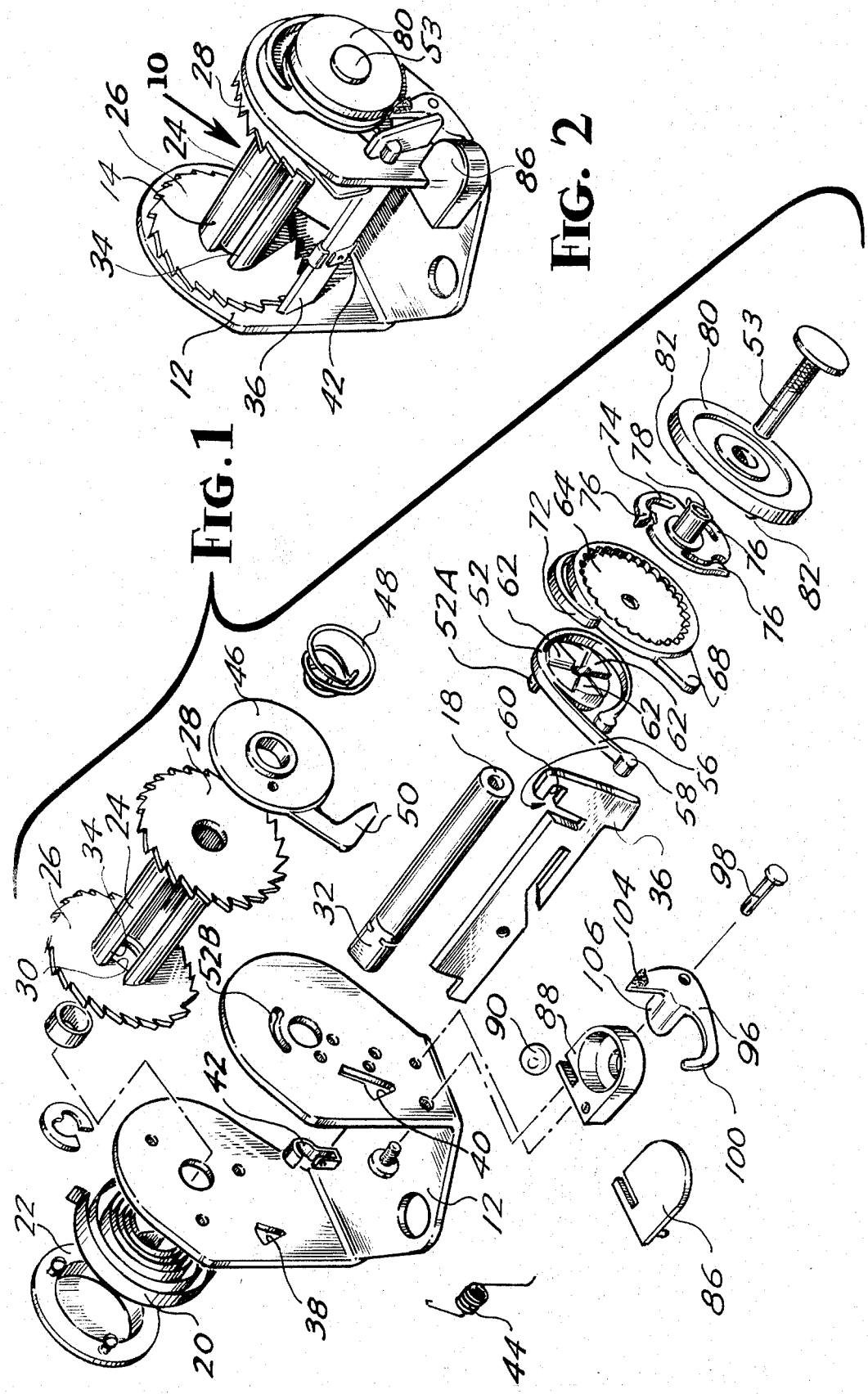

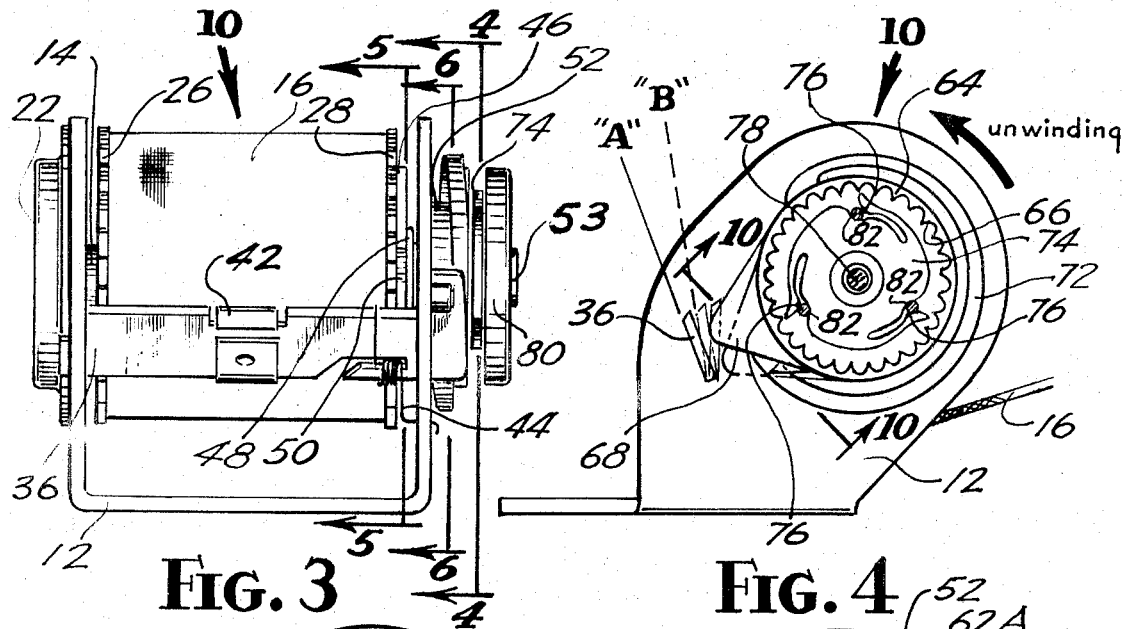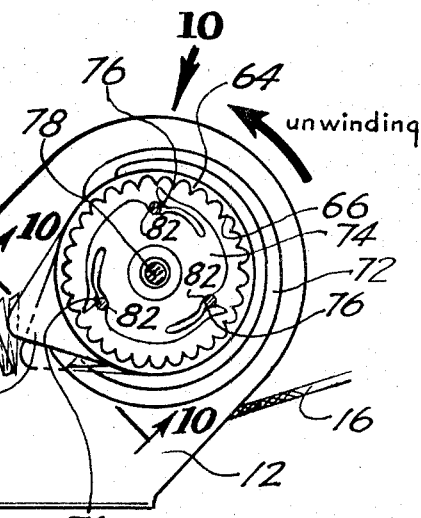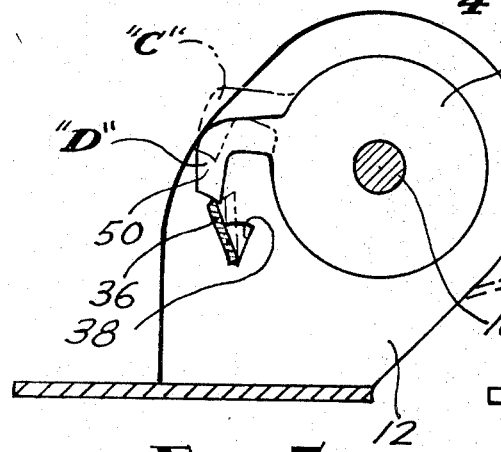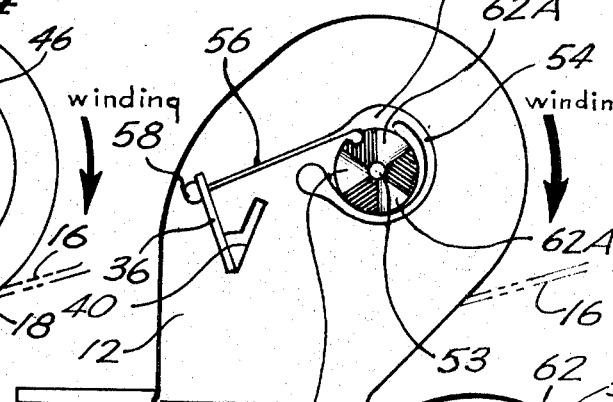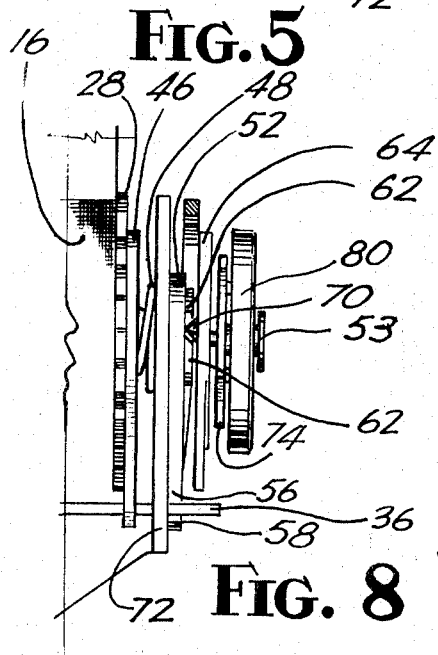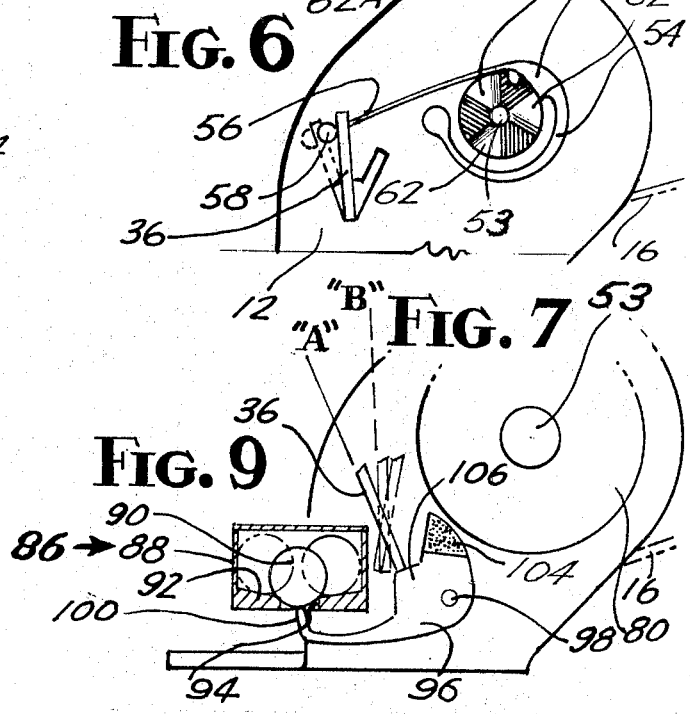

SEAT BELT RETRACTOR WITH GEAR WHEEL ACTUATED LOCKING MEANS

BACKGROUND OF THE INVENTION

This invention relates to a seat belt retractor having means for locking the retractor to prevent the belt from being unwound from a retractor reel.

Seat belt retractors are known in the prior art which permit the user to unwind the belt from a fully wound position on the reel to connect the belt about the user's body. While so connected, the retractor reel is freely rotatable so that the belt accommodates the user's body movements. However, in the event the belt is rapidly unwound from the reel because of a sudden change in position of the user in the vehicle, a locking mechanism is actuated to lock the reel against further rotation so that the belt limits the user's motion.

Such prior art devices have experienced numerous problems because of their sensitivity to normal belt motion. If the locking device is overly sensitive to belt motion, then the user's normal motions are limited. On the other hand, if the locking device is insensitive to belt motion, then the user can experience a relatively large displacement of his body in the vehicle, as during an accident, before the belt restrains his motion.

Still another problem occurs when the user unwinds the belt from its fully wound position as he seats himself in the vehicle. This initial unwinding motion tends to actuate the locking mechanism of conventional locking retractors before the user has actually connected the belt about his body.

SUMMARY OF THE INVENTION

The broad purpose of the present invention is to provide an improved seat belt locking retractor having means preventing the reel from being locked as the belt is being unwound from a fully wound position, regardless of the magnitude of the reel's rotation as the user unwinds the belt.

The preferred embodiment of the invention has two stops for preventing the reel from being prematurely locked. The first stop engages the locking member as the belt is being unwound from a fully wound position. The second stop then engages the locking member until an inertia-operated device moves the stop from its engagement with the locking member. The inertia-operated device is responsive to either the reel being rotated in its unwinding direction at an abnormal rate, or to the retractor support being moved to an abnormal position or to the retractor support being moved in an abnormal motion.

One of the advantages of the preferred seat belt retractor is that the reel can be locked before less than 1/2 inch of the belt has been rapidly unwound from the reel. In addition the means for disabling the reel locking mechanism are composed of a relatively few inexpensive components that can be easily assembled into a reliable assembly.

Still further objects and advantages of the present invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which:

FIG. 1 is an exploded perspective view of a seat belt retractor illustrating the preferred embodiment of the invention;

FIG. 2 is an assembled perspective view of the preferred retractor;

FIG. 3 is an elevational end view of the preferred retractor showing a belt mounted on the reel;

FIG. 4 is a view taken along lines 4—4 of FIG. 3, showing the manner in which the locking member is engaged by one of the stops;

FIG. 5 is a view taken along the lines 5—5 of FIG. 3, showing the manner in which the locking member is engaged by the other stop;

FIG. 6 is a view taken along lines 6—6 of FIG. 3 showing the means for disabling the stop of FIG. 3;

FIG. 7 is a view similar to FIG. 6, but showing the disabling means in another position;

FIG. 8 is a fragmentary plan view of the preferred retractor;

FIG. 9 is a fragmentary view of the inertia-operated device;

DESCRIPTION OF THE PREFERRED EMBODIMENT

Figures 10, 11:
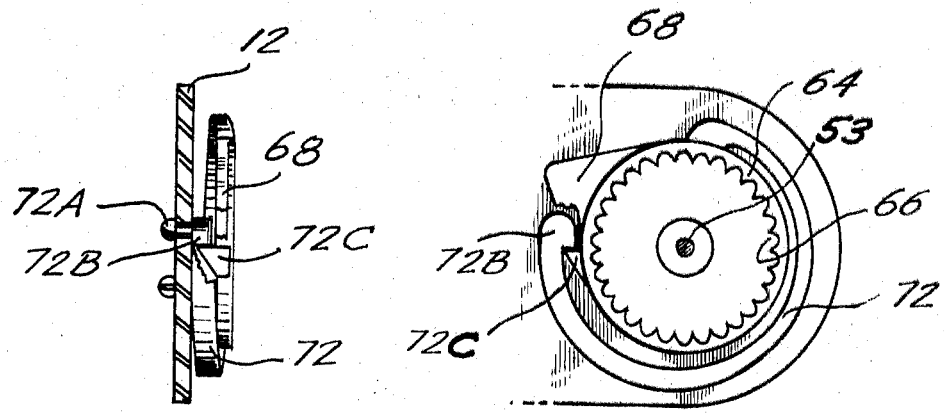
FIG. 10 is a view taken along lines 10—10 of FIG. 4.
FIG. 11 is a view similar to FIG. 4 but with the stop broken away for descriptive purposes.

Referring to the drawings, a preferred seat belt retractor 10, illustrated in FIGS. 1 and 2, includes a U-shaped support 12. Reel means 14 are rotatably mounted on the side walls of support 12. As shown in FIG. 3, an elongated flexible conventional seat belt 16 is connected to reel means 14 so as to be wound thereon as it is being rotated in one direction, and to be unwound from the reel means as it is being rotated in the opposite, unwinding direction.

As can be seen in FIG. 1, reel means 14 includes a reel 18 that is journaled on the side walls of support 12. A spiral spring 20 having one end connected to the end of reel 18, and its opposite end connected to support 12, urges the reel toward rotation in the winding direction. A housing 22 is mounted on support 12 to enclose spring 20. Reel means 14 further includes a cylinder 24 and a pair of generally circular ratchets 26 and 28 secured to the ends of cylinder 24. Ratchet 26 has an opening with a flat side 30 that is engaged with a flat portion 32 of reel 18 so that both ratchets and cylinder 24 rotate together with reel 18.

Cylinder 24 has an opening 34 that extends from ratchet 26 to ratchet 28. Ratchets 26 and 28 are spaced a sufficient distance to allow the end of seat belt 16 to be connected to the reel by having its end passed through opening 34 around reel 18, and out opening 34 to a position where it is connected to the belt to form a loop.

A locking member 36 is mounted in a pair of openings 38 and 40 formed in the side walls of support 12. Locking member 36 is pivotal between a locking position in which it engages the teeth of ratchets 26 and 28 to prevent rotation of reel 18 in the unwinding direction, and a pair of release positions in which the reel is rotatable in the unwinding direction.

A clip 42 is mounted on locking member 36 to engage belt 16 as it is being wound on the reel means. The position of locking member 36 is such that as the belt is being wound on cylinder 24, the belt contacts clip 42 to bias the locking member away from ratchets 26 and 28 prior to the belt being disposed in a fully wound position. Similarly, clip 42 prevents the locking member from being moved toward its locking position until a portion of the belt has been unwound from the reel. Clip 42 can be bent to compensate for variations in belt thickness so that the engagement between the locking member and the belt does not prevent a relatively thick belt from being fully wound on the reel.

A spring 44, mounted on locking member 36, is connected to support 12 to bias the locking member toward its locking position. Spring 44 also biases the locking member toward the bottom of pie-shaped openings 38 and 40.

Now referring to FIGS. 3 and 5, a clutch plate 46, preferrably formed of plastic, is slideably mounted on reel 18 between the side wall of support 12 and ratchet 28. A conically-shaped spring 48 is mounted on reel 18 between the clutch plate and the support sidewall to urge the clutch plate toward frictional engagement with ratchet 28. One end of the spring is connected to the clutch plate and the other end is connected to the support so that as the clutch plate is rotated in the unwinding direction, as viewed in FIG. 5, from position C to position D, the spring increases its bias on the clutch plate toward motion in the opposite direction.

A stop 50 is carried by clutch plate 46 to engage locking member 36 when the reel is being rotated in the unwinding direction. As belt 16 is being unwound from the reel, stop 50 can engage locking bar 36 in either of two positions depending upon whether the belt is fully or only partially wound on cylinder 24 as the unwinding motion is commenced. If belt 16 is fully wound on cylinder 24, then locking member 36 will be in its furthermost position away from ratchets 26 and 28 as shown in FIG. 4 at A. As the belt is unwound, clutch plate 46 is rotated from its position C to position D such that stop 50 engages locking bar 36 in its A position to prevent it from moving toward the ratchets.

If, however, belt 16 is partially unwound when the unwinding motion of the reel is commenced, the locking member 36 will be in an intermediate, release position illustrated in phantom at B in FIG. 4. Rotation of reel 18 in the unwinding direction will then rotate the clutch plate such that stop 50 engages the top of the locking member in its position B so as to be inoperable to prevent motion of the locking member toward the ratchets.

Referring to FIGS. 6 and 7, a disabling member 52 is rotatably mounted on a pin 53 carried on the end of reel 18. As best shown in FIG. 1, disabling member 52 has finger 52A received in a slot 52B in support 12 for limiting the rotational displacement of member 52. A resilient arm 54 carried by member 52 is connected to support 12 to bias the disabling member in the winding direction. An arm 56, carried by disabling member 52, has an enlargement 58 connected through an opening 60 of locking member 36 in such a manner that as the locking member is pivoted from its full release position, illustrated in FIG. 6, to its intermediate release position, illustrated in FIG. 7, disabling member 52 is rotated a few degrees in the winding direction by arm 54. In this later position, enlargement 58 becomes slightly disengaged from the locking member so as not to prevent its motion toward the ratchets.

Disabling member 52 preferably has a circular configuration with its center coinciding with the axis of rotation of reel 18. Three equi-spaced, similarly shaped ridges 62 are formed on member 52, each being bounded by two radii and an included arc of the circular perimeter of member 52. Each ridge has a flat top that is parallel to the side wall of support 12, and a ramp 62A on one side of the top.

Referring to FIG. 4, a wheel 64 is rotatably mounted on pin 53 adjacent disabling member 52. Wheel 64 has an annular series of regularly spaced teeth 66 formed concentrically about the axis of rotation of pin 53. Wheel 64 has a radial enlargement forming a stop 68 for engaging locking member 36 in its intermediate release position B.

Referring to FIG. 8, wheel 64 has a planar surface facing disabling member 52 and three rounded, generally conical projections 70 engaging ridges 62. Wheel 64 is axially movable on pin 53 with respect to disabling member 52. When locking member is in position A, projections 70 are disposed between ridges 62, and wheel 64 is closely adjacent disabling member 52. As disabling member 36 is rotated in the winding direction in response to the motion of locking member 52 from position A to position B, ramps 62A cam projections 70 to move wheel 64 away from disabling member 52.

Referring to FIGS. 10 and 11, wheel 64 is preferably formed of plastic, and has a resilient arm 72. The outer end of arm 72 has a finger 72A received in an opening in support 12 to bias wheel 64 both toward disabling member 52 and toward motion in the winding direction. The outer end of arm 72 also has a foot 72B for engaging a shoulder 72C carried by the wheel to position stop 68 to abut locking member 36 in its intermediate release position.

As shown in FIG. 4, an actuator 74, is mounted with a press fit on pin 53 adjacent wheel 64. Actuator 74 has three resilient elongated pawls 76. Each pawl 76 is radially movable between inner and outer positions. In its inner position, the tip of each pawl is spaced inwardly from the profile of teeth 66. In its outer position, each pawl is adjacent the path of motion of teeth 66.

As shown in FIG. 8, if projections 70 are disposed between ridges 62 of the disabling member, actuator 64 is axially spaced from wheel 64 so that pawls 76, in their outer positions, cannot engage teeth 66. However, when wheel 64 has been cammed by ridges 62 toward actuator 74, pawls 76 are movable radially outwardly toward teeth 66. When the pawls are engaged with the teeth, the actuator is operative to rotate the wheel in the unwinding direction with reel 18 to move stop 68 away from the locking member 36 to the position illustrated in phantom in FIG. 4. In this position, stop 68 is inoperative to prevent the locking member from engaging ratchets 26 and 28.

Actuator 74 has a cylindrical shoulder 78 rotatably supporting an inertia wheel 80. Inertia wheel 80 carries three pins 82 engaging the free ends of pawls 76. Wheel 80 has a mass selected such that it normally rotates with the actuator. However, in response to a predetermined rotational acceleration of the reel in the unwinding direction, wheel 80 rotates with respect to the actuator to cam pawls 76 toward their outer positions. Pin 53 locks inertia wheel 80 against axial motion on the pin.

Referring to FIG. 9, an inertia-operated means, generally indicated at 86, is mounted adjacent inertia wheel 80. Inertia-operated means 86 includes a housing 88 mounted on support 12 and a metal ball 90 disposed in the housing so as to be movable on a generally conical base 92. Base 92 has an opening 94 in which ball 90 is normally seated. A lever 96 is pivotally mounted on a pin 98 which is in turn mounted on the side wall of support 12. One end of the lever 96 has a finger 100 which is normally disposed in opening 94 in contact with ball 90. Lever 96 also has permanent magnet 104 disposed adjacent inertia wheel 80.

The arrangement is such that the weight of ball 90 prevents magnet 104 from engaging inertia wheel 80 unless the ball is displaced from opening 94. When arm 94 is released by ball 90, magnet 104 engages the inertia wheel such that rotation of reel 18 in the unwinding direction causes the inertia wheel to rotate with respect to actuator 74 thereby camming pawls 76 toward the teeth of wheel 64.

Base 92 of housing 88 is formed such that normally ball 90 will be seated in opening 94. However, in the event support 12 is moved to an abnormal position, or in an abnormal motion, such as might occur when a vehicle in which the retractor is mounted is involved in an accident, ball 90 becomes unseated from opening 94 to permit the lever to engage the inertia wheel and thereby actuate pawls 76.

Lever 96 has a boss 106 engageable with the lower edge of locking member 36. Boss 106 is formed such that when locking member 36 is in its full release position A, it prevents lever 96 from being rotated by spring 102 even though ball 96 is unseated from opening 94. When locking member 36 is pivoted to its intermediate release position B, it is inoperative to prevent lever 96 from being rotated toward inertia wheel 80. The purpose of boss 106 is to disable the inertia-operated means when belt 16 is in its fully wound position, thereby preventing the retractor from being locked when the belt is being unwound from its fully wound position.

OPERATION

When seat belt 12 is not being used, it is biased toward a fully wound position on reel means 14 by spring 20. In this belt position, locking member 36 is in its full release position A with stop 50 in its position C. As the user unwinds the belt from the reel, the initial rotation of the reel in the unwinding direction rotates stop 50 to position D, as illustrated in FIG. 5, to prevent locking member 36 from moving toward ratchets 26 and 28 as long as the belt is being unwound. The user can then unwind any length of the belt from the reel with any type of unwinding motion without releasing locking member 36 from its full release position.

Assuming the user has unwound an appropriate length of the belt, the termination of the unwinding motion permits spring 48 to move stop 50 to position C. Locking member 36 then pivots to its intermediate release position B in which it engages stop 68, as shown in FIG. 4. Thus stop 50 prevents the reel from being locked against rotation upon the initial extension of belt 16 from its fully wound position. Stop 68 then is operating to prevent the locking member from engaging the reel.

As locking member 36 is pivoted to its intermediate release position, disabling member 52, in response to the motion of the locking member, is rotated by arm 54 to cam wheel 64 toward actuator 74. Wheel 64 is then disposed such that teeth 66 are adjacent the outer positions of pawls 76. The pawls are then movable toward teeth 66 in response to rotation of inertia wheel 80 with respect to actuator 74.

Assuming reel 18 should be rotated rapidly in the unwinding direction by a pulling effort on belt 16, the inertia wheel, because of its mass, rotates slightly with respect to actuator 74 to cause pins 82 to cam pawls 76 radially outwardly to mate with teeth 66. Wheel 64 is then connected to reel 18 so as to be rotated in the unwinding direction. As can be seen in FIG. 4, a relatively small rotation of stop 68 permits locking member 36 to be moved by spring 44 toward ratchets 26 and 28 and a locking position that prevents further unwinding of the belt. The locking motion is so responsive to the belt motion that the reel is locked against motion in the unwinding direction before 1/2 inch of belt 16 has been unwound from the reel in a rapid unwinding motion.

Assuming that locking member 36 is in its intermediate release position B, the locking member can be actuated by inertia-operated means 86. Such a response can occur as the retractor is moved either to a position or in a motion that unseats ball 90 to permit magnet 104 to engage inertia wheel 80. A slight motion of reel 18 in the unwinding direction causes pawls 76 to engage wheel 64 and thereby release the locking member 36.

When locking member 36 is engaged with ratchets 26 and 28, the user need only allow a small amount of belt 16 to be wound on reel means 14 to rotate stop 68 in the winding direction to engage and return locking member to its intermediate position B. This motion of the reel in the winding direction also rotates actuator 74 with respect to inertia wheel 80 to return pawls 76 to their normal inner positions.

The preferred seat belt retracting device has several advantages over prior art devices. For example, the actuating pawls 76 need only be cammed a fraction of an inch to engage wheel 64 and release the locking member for motion to its locking position. The motion necessary to cam the pawls is only a few degrees of rotation of the inertia wheel with respect to actuator 74. In addition the actuating means is relatively insensitive to lubricants because of the positive engagement of the actuating pawl 76 with the teeth 66 as opposed to devices employing a friction clutch.

Magnet 104 could be replaced by mounting an over the center spring on lever 96 so as to bias an arm toward engagement with the inertia wheel.

The actuating means is so mounted on the reel that its operation is not affected by the position of the retractor in the vehicle.

Having described my invention, I claim:
1. A seat belt retracting device comprising:
   a support;
   a reel mounted on the support for rotation;
   an elongated seat belt having one end connected to the reel so as to be wound thereon upon rotation of the reel in a winding direction, and to be unwound therefrom upon rotation of the reel in the opposite, unwinding direction;
   bias means yieldingly urging the reel toward rotation in the winding direction;

a locking member mounted on the support for motion toward a locking position to engage the reel to prevent reel rotation in the unwinding direction, from a release position in which the locking member does not prevent reel rotation, and means for biasing the locking member toward said locking position;

a first stop member rotatably mounted on the reel and disposed in the path of motion of the locking member to prevent it from moving toward said locking position as the belt is being unwound from a fully wound position toward a partially wound position, and means for removing the first stop member from the path of motion of the locking member upon termination of reel rotation when the belt is disposed in said partially wound position;

a second stop member rotatably mounted on the reel in a first rotative position in which it prevents movement of the locking member to said locking position when the belt is in said partially wound position, means for axially moving the second stop member along the reel from a first axial position toward a second axial position as the belt is being unwound from said partially unwound position, the second stop member having an annular series of regularly spaced teeth disposed about the reel; and a pawl mounted on the reel to engage the teeth of the second stop member in said second axial position to connect the second stop member to the reel such that the second stop member is disengaged from the locking member as the reel is being rotated in the unwinding direction whereby the locking member engages the reel to prevent further rotation in the unwinding direction.

2. A seat belt retracting device as defined in claim 1, including an inertia member rotatably mounted on the reel to move the pawl to engage the teeth of the second stop member.

3. A seat belt retracting device as defined in claim 2, including inertia-operated means so connected to the locking member as to prevent motion of the first stop member unless a portion of the belt has been unwound from its fully wound position on the reel.

4. A seat belt retracting device as defined in claim 1, including a disabling member rotatably mounted on the reel, the disabling member having spaced planar ridges, and a projection carried by the second stop member disposed between the planar ridges such that as the disabling member is rotated with respect to the second stop member, the spaced ridges cam the stop member from its first axial position to its second axial position.

5. A seat belt retracting device as defined in claim 1 including an inertia member mounted on the reel for moving the pawl toward said teeth as the inertia member is rotated with respect to the pawl, and including a ball movably mounted on the support, and means for rotating the inertia member with respect to the pawl in response to a movement of the ball with respect to the support as the reel is being rotated.

6. A seat belt retracting device as defined in claim 5, in which said last mentioned means are operable to prevent movement of the locking member toward said locking position unless the belt has been unwound from a fully wound position on the reel.

7. A seat belt retracting device comprising:

a support;

a reel mounted on the support for rotation in either a winding direction or in the opposite unwinding direction;

an elongated seat belt connected to the reel so as to be wound thereon as the reel is being rotated in a winding direction and to be unwound therefrom as the reel is being rotated in the opposite unwinding direction;

bias means for urging the reel in the winding direction;

a locking member mounted on the support for motion toward a locking position in which it prevents rotation of the reel in the unwinding direction from a release position in which the locking member does not prevent reel rotation, and means for biasing the locking member towards said locking position;

a first stop member rotatably mounted on the reel and disposed in the path of motion of the locking member to prevent it from moving toward said locking position as the belt is being unwound from a fully wound position toward a partially wound position by rotation of the reel in the unwinding direction, and means for removing the first stop member from the path of motion of the locking member upon termination of such reel rotation;

a second stop member rotatably mounted on the reel in a first axial position in which it engages the locking member to prevent movement thereof toward said locking position when the belt is in said partially wound position, the second stop member being movable from said first position toward a second axial position as the belt is being unwound from said partially unwound position to rotate the reel;

a disabling member rotatably mounted on the reel means for rotating said disabling member as the first stop member is being moved out of the path of motion of the locking member, and a cam carried by the disabling member and engaged with the second stop member to move it axially from said first position toward said second position as the disabling member is being rotated; and means mounted on the reel for engaging the second stop member in said second position to connect it to the reel such that the second stop member is disengaged from the locking member as the reel is being rotated in the unwinding direction, whereby the locking member engages the reel to prevent further rotation in the unwinding direction.

* * * * *